Feb. 9, 1960 H. ANGEL ET AL 2,924,716

X-RAY APPARATUS

Filed Aug. 12, 1958

United States Patent Office 2,924,716
Patented Feb. 9, 1960

2,924,716

X-RAY APPARATUS

Harald Angel and Johann Christ, Vienna, Austria, assignors to Elin Aktiengesellschaft für elektrische Industrie, Vienna, Austria, an Austrian corporation Application August 12, 1958, Serial No. 754,614

Claims priority, application Austria August 12, 1957

12 Claims. (Cl. 250—58)

This invention relates to X-ray examination apparatus and is particularly concerned with an equipment allowing to use only one single X-ray tube in positions both above and below the examination table.

It is the chief object of our invention to apply a coupling device attached to the assembly consisting of the tube housing and the tube shutter.

This coupling device consists of a housing having two clutch shifters, one for coupling with the tube support of the tube stand, the other for coupling with the spot film device which is in a well known manner attached to a carriage. In this coupling device there are provided also remote-controlled contacts serving for the release of the coupling and decoupling process and moreover there are contacts serving for reciprocal interlocking of the several coupling positions.

It is one performance of the present invention, to render possible when applying the X-ray tube in a position below the exmination table, to decouple the coupling device carrying the tube housing and the tube shutter from the X-ray tube support of the tube stand and to couple up the coupling device automatically with the spot film device attached on a carriage, while the tube support of the stand is driven out without tube.

The X-ray apparatus is thus working in the same way as one having two X-ray tubes, of which one is used in a position above the examination table and the other is used in a position below the examination table.

A further object of the invention is to apply a control mechanism controlling that always one of both coupling positions is occupied.

Another object of the invention is to effect the coupling process in special position of the spot film device with regard to the tube support, preferably the coupling process may be effected, after the coach has been brought in a vertical position.

According to another object of the invention both the tube support and the spot film device are blocked in their movement during the coupling process, whereas afterwards only the decoupled element remains blocked. This movement blocking may be executed in a well known manner as a self-locking one.

The clutch housing contains the elements serving for the coupling mechanism consisting of two clutch dogs one for the tube support, the other for the spot film device, springs and other elements and contains also the elements serving for release mechanism consisting of two coupling magnets, with their armature bolts and armature springs, one of said magnets being provided for the tube support, the other for the spot film device. The clutch housing has also a retainer-element for holding the assembly consisting of the tube housing and the tube shutter.

It is accordingly one of the principal objects of the present invention that the clutch dogs cooperate with the corresponding clutch pawls of the two clutch parts to be coupled to the coupling device, one of said clutch parts being fixed at the tube support, the other part fixed to the spot film device. The coupling process is effected by means of pressure springs which are guided in spring barrels. During the clutching operation, the working clutch dog is turned around a bolt guided in a slotted hole, causing the corresponding armature bolt pressed by the armature spring to spring in a corresponding bore hole in the clutch dog, serving now as pivot for the moving of the clutch dog.

According to another object of the invention the clutch dog which is first brought into engagement with its corresponding clutch pawl (of the tube support or the spot film device) has to be undetachable by the release mechanism normally acting in the coupling device. Namely it is one object of our invention that the contact surfaces of the cooperating elements of the clutch dog and the clutch pawl act one upon the other as inclined planes and therefore the clutch dog is pressed against the clutch pawl with a great action of force. Therefore the bearing pressure of the armature bolt in its bore hole in the clutch dog increases to such an extent that the initial power of the coupling magnet will not suffice to draw out the armature bolt. The drawing out of said bolt can only be operated by hand or by a special tool applying a great force as it is usual when demounting the apparatus.

When one clutching part p.e. that of the tube support has been coupled with the clutch housing and the second clutching part p.e. that of the spot film device has then to be coupled with the clutch housing, two feelers, each of said feelers being attached to its clutching part, serve to ascertain by feeling the coupling position. According to another object, these feelers serve otherwise to decrease the bearing pressure of the armature bolts in their bore holes by removing the clutch dogs by means of pivoted levers.

Therefore the armature bolts can be removed by the initial power of the coupling magnets.

Referring to another object of the invention, there are provided safety interrupting contacts in the clutch housing, serving to prevent in a well known manner the simultaneous release of both coupling magnets. In the case of demounting of the whole coupling device there is provided a handle which can be actuated by hand or by a special tool.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings.

Figure 1:
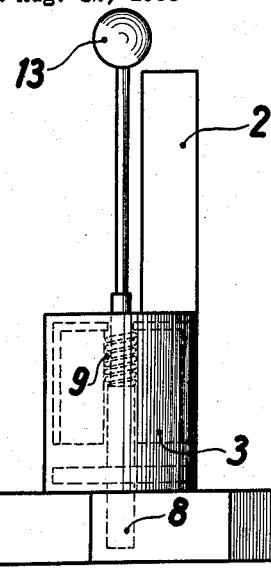
Figure 1 is a principal manufacture of the whole coupling device in schematic manner.

The clutch housing 1 has a retainer element 2 for holding the assembly consisting of the tube housing and the tube shutter (not shown). This housing has the coupling part E which cooperates with the coupling part C of the tube support of the stand and with the coupling part D of the spot film device. The coupling part E contains the elements which are necessary for the coupling and decoupling process, that is the coupling magnets 3, the armature bolts 8, the armature springs 9, the clutch dogs 6 moving around the bolts 7 which are guided in slotted holes. There are also the pressure springs 11 guided in spring barrels 10, which springs are adjustable by screws 12. The handle 13 is provided for demounting the whole coupling device. The coupling parts C and D contain the clutch pawls 5, the feelers 4 and the levers 14. By means of the feelers 4 the levers 14 move the coupling pawls 5 which are supported elastically and in their turn bear upon the clutch dog 6. At the coupling part E there are also provided safety contacts 15 which prevent the simultaneous release of the both coupling magnets.

Figure 2:
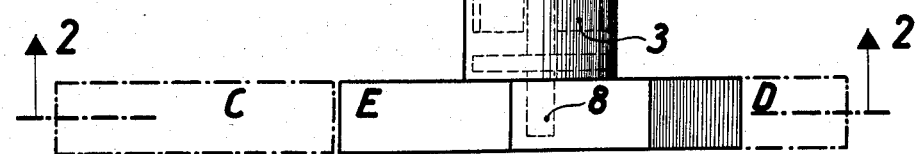
Figure 2 is a sectional view on the lines 2—2 of Figure 1.

In the following the method of operation of the device according to the invention is explained by way of example by describing the sequence of operative steps: When the clutch part E is coupled with the clutch part D of the spot film device, as is illustrated in Figure 2, this coupling position is not releasable by means of the release mechanism embodied by the coupling magnets 3 and fitted into the coupling device. This undetachability is caused by the great bearing pressure of the respective armature bolt 8 of the coupling magnets 3 in its bore hole in the clutch dog 6, as already described above. When the coupling part E will become coupled with the coupling part C of the tube support, the feeler 4 determines the coupling position. While the two coupling parts E and D will approach one another the clutching pawl 5 strikes against the clutch dog 6 and the latter is turned around the bolt 7 guided in a slotted hole. In this moment the armature bolt 8 actuated by the armature spring will spring in its corresponding bore hole in the clutch dog 6. The bolt 8 serves now as a pivot for the clutch dog 6. During this coupling process the clutch dog 6 is pressed against the clutching pawl 5 by means of the compressing spring 11 guided in a spring barrel 10. The length of the spring 11 is adjustable by the adjusting screw 12. During the coupling of the coupling part C with the assembly consisting of the coupled parts E and D, the feelers 4, which are adjustable in their length, move by means of the pivoted levers 14 the clutch pawls 5 in such a manner that by their action on the clutch dogs 6 the bearing pressure on both armature bolts 8 decreases considerably. The initial power of the coupling magnets 3 will thus overcome the small bearing pressure developed by the pressure spring 11. After release of one of the two coupling magnets, the coupling part E can be easily drawn out of the corresponding coupling part, while the clutch dog 6 turns around the bolt 7 and the pressure spring 11 exerts only a small counteracting force. In the case of a faulty connection a simultaneous releasing of both clutching magnets 3 is prevented by additional safety interrupting contacts 15. The described sequence of coupling is symmetrically reversible.

What is claimed is:

1. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, controlling means consisting of remote-controlled contacts for the release of the coupling and decoupling processes, remote-controlled contacts serving for reciprocal interlocking of the several coupling positions and safety interrupting contacts preventing the simultaneous release of both the coupling parts.

2. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said tube support being decoupled of the coupling device in case of radiography below the X-ray examination table and being then driven out without tube while the coupling device has to become coupled with the spot film device.

3. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, said coupling device having blocking means securing that one coupling position is occupied.

4. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a support attached to a tube stand or to a spot film device fitted on a carriage, said coupling means consisting of two clutch shifters, said tube support and said spot film device having each corresponding coupling parts capable of engaging with said clutch shifters on said coupling device, said coupling device being coupled with one of the corresponding coupling parts of the tube support or of the spot film device when said tube support and said spot film are occupying special relative positions to each other.

5. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, said tube support and said spot film device being mechanically blocked in their movement during coupling processes.

6. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, each of said corresponding coupling parts of said tube support or of said spot film device, when unoccupied, having an adjustable self-locking lock.

7. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device comprising in combination coupling elements serving for the coupling mechanism and releasing elements serving for the release mechanism, a retainer element carrying the assembly consisting of the tube housing and the tube shifter, and a handle serving for demounting being operated by hand or by a special tool.

8. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device comprising in combination coupling elements serving for the coupling mechanism, releasing elements serving for the release mechanism, said coupling elements comprising two clutch dogs, one of said clutch dogs being provided for coupling with the tube support, the other being provided for the spot film device, each of said clutch dogs first being pivoted around a bolt during coupling, said bolts guided in slotted holes, and having a further bore hole serving for an armature bolt now serving as a pivot when coupled, two pressure springs guided in spring barrels and adjustable by screws, each of said pressure springs bearing upon one of the clutch dogs in its coupled position.

9. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device comprising in combination coupling elements serving for the coupling mechanism and release elements serving for the release mechanism, said release mechanism comprising two coupling magnets one being provided for the tube support, the other being provided for the spot film device, each of the coupling magnets having an armature bolt and each of said armature bolts having its armature spring, each of said armature springs serving to press its armature bolt into the bore hole in its corresponding clutch dog, when said clutch dog is turned around its bolt during coupling.

10. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, each of said corresponding coupling parts of the tube support and of the spot film device comprising in combination an elastically supported clutch pawl cooperating with the corresponding clutch dog of the coupling device, a feeler for ascertaining the coupling position, said feeler being adjustable in its length by adjusting screws, a lever being pivoted on a bolt, said lever cooperating with said feeler and serving to bear upon the elastically supported clutch pawl to enable said clutch pawl to act on the corresponding clutch dog of the coupling device in such a manner as to cause decreasing of the bearing pressure on both armature bolts in their bore holes in said clutch dogs when one coupling part of the tube support or the spot film device being coupled and the other having to become coupled.

11. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, in case of coupling only one of the corresponding coupling parts of the tube support or of the spot film device, the bearing pressure of the armature bolt in its bore hole in the clutch dog being unsuperable by the initial power of the coupling magnet thereby causing the coupling position to become indetachable by means of the normally acting release elements.

12. An X-ray apparatus comprising a single X-ray tube serving for use both above and below an X-ray examination table, a coupling device having attached an assembly consisting of the tube housing of said X-ray tube and of the tube shutter, said coupling device having coupling means to couple said assembly either to a tube support attached to a tube stand or to a spot film device fitted on a carriage, said coupling means consisting of two clutch shifters, said tube support and said spot film device having each corresponding coupling parts capable of engaging with said clutch shifters on said coupling device, when one coupling part of said coupling device being coupled and the other to become coupled, two coupling parts in said coupling device, a feeler in each coupling part, each of said both feelers in the coupling parts of the tube support and the spot film device being in cooperation with its lever, said levers bearing upon the elastically pivoted clutch pawls to cause by means of said clutch pawls decreasing of the bearing pressure of the armature bolts in their bore holes in the corresponding clutch dogs, enabling now one or the other of said armature bolts to become released by the initial power of its corresponding coupling magnet so as to decouple the coupled coupling part and to couple the other coupling part.

References Cited in the file of this patent
UNITED STATES PATENTS

| | | |
|---|---|---|
| 2,190,458 | Raab | Feb. 13, 1940 |
| 2,504,687 | Hollstein | Apr. 18, 1950 |

UNITED STATES PATENT OFFICE

CERTIFICATE OF CORRECTION

Patent No. 2,924,716                                 February 9, 1960

Harald Angel et al.

It is hereby certified that error appears in the printed specification of the above numbered patent requiring correction and that the said Letters Patent should read as corrected below.

Column 5, line 1, for "shifter" read -- shutter --.

Signed and sealed this 23rd day of August 1960.

(SEAL)
Attest:

KARL H. AXLINE                                 ROBERT C. WATSON
Attesting Officer                              Commissioner of Patents